*INVENTOR.*
JOSEPH G. CALLAHAN
BY Kenway, Jenney & Hildreth

ATTORNEYS

April 19, 1966  J. G. CALLAHAN  3,246,527
SUSPENSION FOR GYROSCOPE GIMBAL
Filed July 24, 1961  2 Sheets-Sheet 2
FIG. 3
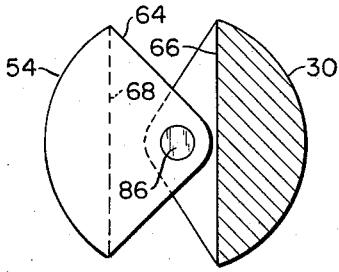
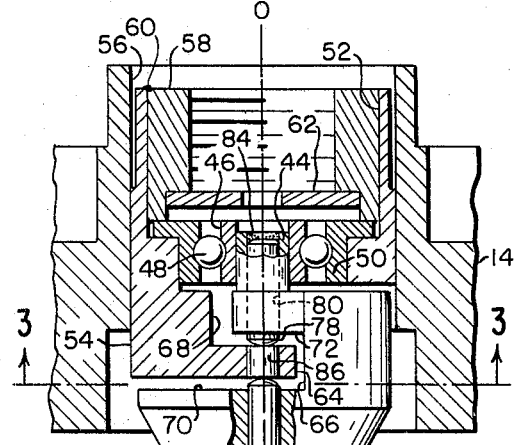
FIG. 2
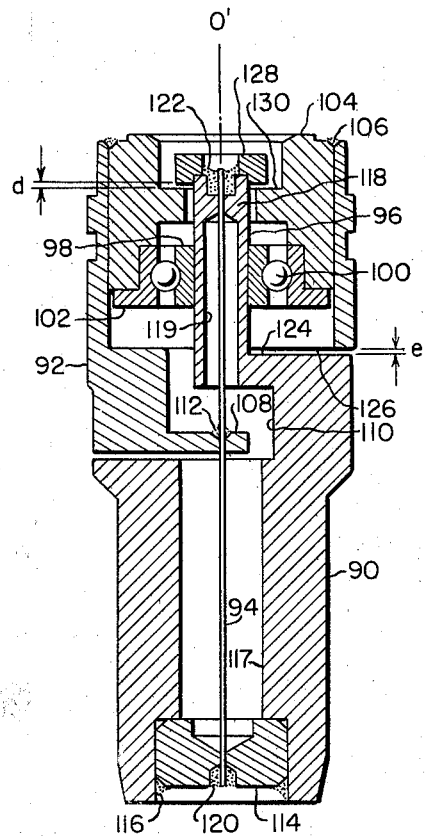
FIG. 4
INVENTOR.
JOSEPH G. CALLAHAN
BY Kenway, Jenney & Hildreth
ATTORNEYS

United States Patent Office 3,246,527
Patented Apr. 19, 1966

3,246,527
SUSPENSION FOR GYROSCOPE GIMBAL
Joseph G. Callahan, Norwood, Mass., assignor to Northrop Corporation, Beverly Hills, Calif., a corporation of California
Filed July 24, 1961, Ser. No. 126,107
6 Claims. (Cl. 74—5)

This invention relates to suspensions for gyroscope gimbals, and more particularly to an improved gimbal suspension for an integrating gyroscope, that is, a gyroscope in which a gimbal is free to rotate without torsional restraint through limited angular displacement about an output axis, to generate an output signal proportional to a precessional angular displacement about the output axis applied by a rotor revolving on a rotational axis, as the gyroscope is rotated about an input axis, the three axes being mutually perpendicular. To afford an output signal which is accurately responsive to the angular displacement, it is necessary to provide bearings for rotatably supporting the gimbal on the output axis which entail a minimum amount of frictional restraint against rotation; furthermore, the value of the restraint resulting from friction or other causes must remain substantially constant in spite of relative thermal expansion of the gimbal and the gryoscope case over a range of operating temperatures. At the same time, means must be provided for axially locating the gimbal along the output axis with respect to a supporting case.

It has hitherto been proposed to place a pair of balls along the output axis at opposite ends of the gimbal shaft to act as thrust bearings. However, such bearing means are subject to varying axial loads arising from relative thermal expansion of the case and the gimbal, resulting in variations in the frictional restraint against rotation of the gimbal. Combination thrust and radial bearings have also been applied to opposite ends of the gimbal shaft, but this arrangement is subject to similar shortcomings.

It is the primary object of this invention to provide an improved suspension for rotatably mounting a gyroscope gimbal on an output axis, and for axially locating the gimgal thereon, which minimizes and maintains substantially uniform the frictional restraint against angular movement of the gimbal about the axis.

It is another object of the invention to provide an improved gimbal suspension which maintains a uniform minimum frictional restraint against angular displacement of a gyroscope gimbal, in spite of relative thermal expansion of the gimbal and its supporting case.

It is a further object of the invention to provide a gimbal suspension of the kind having radial bearings rotatably supporting a gimbal about an output axis, with means for preventing axial preloading of the radial bearings by axial thrust of the gimbal, or by relative thermal expansion of the gimbal and a supporting case.

It is still another object of the invention to provide an improved gimbal suspension of the kind in which a gimbal is supported rotatably in radial bearings, with means for supporting the gimbal against axial displacement, which minimize frictional resistance to rotation of the gimbal.

Further objects and advantages of the invention will become apparent as the following description proceeds.

Briefly stated, I may carry out my invention in part by mounting a gimbal having shaft means in a case by means of a pair of axially-spaced radial bearings for rotation about an output axis, in such a manner that the gimbal is axially slidable in the bearings and cannot apply preloading thereto, which might otherwise arise from relative thermal expansion of the gimbal and the case. For axially locating the gimbal, I form a suspension head at one end of the case with a thrust support leaf which extends transversely across the output axis, and is received within an axially-extending recess formed in the shaft means. The recess terminates in axially-confronting portions, to which are secured suspension means which rotatably engage the support leaf along the axis to provide axial constraint of the gimbal in either direction by the sole means of the leaf. In this manner, the radial bearings are entirely relieved of axial preloading which would otherwise result from their support of the axial thrust or from relative thermal expansion.

In an integrating gyroscope, it is desirable for accurate response to minimize frictional restraint against angular displacement of the gimbal, as well as to maintain this restrain at a uniform value. According to the invention, alternative suspension means are provided for transmitting axial thrust from the recessed shaft means to the thrust support leaf of the suspension head, either of which means in themselves generate reduced frictional restrain of rotation.

In one form of the invention, the suspension means comprise thrust pins formed of a material having a high elastic modulus. These pins are secured in the axially-confronting portions at the ends of the recess, and extend along the axis into approximately point contact with opposite plane surfaces of the support leaf, which may be fitted with a bearing insert of a similar material. The use of a material of high elastic modulus, such as tungsten carbide, alumina, or diamond, minimizes the area of surface contact and thus limits frictional restraint of the gimbal to a minimum. The thrust pins may further be surface treated by a coating of indium, molybedenum disulphide, or equivalent materials, to further reduce friction.

In another form of the invention, the suspension means comprise a fine elongated wire or ribbon extending along the recess on the output axis, secured at either end to the axially-opposed portions and at an intermediate point to the support leaf. By using a wire whose torsional spring constant is sufficiently small, the torsional restraint may be compensated by well-known electromagnetic torquing devices to meet the requirements of any desired class of integrating gyroscope. Thrust is absorbed in tension, rather than in compression as in the foregoing embodiment. In this embodiment, frictional restraint against rotation, other than that imposed by the radial bearings themselves, is entirely eliminated.

In mounting the suspension wire, I prefer to apply sufficient tension to stretch the wire to about one-half its elastic limit. Axial thrust imposed by accelerations of the gimbal along the output axis then causes the tensile load in one half of the wire to increase, and the tensile load in the other half to decrease proportionately. This prestressing of the wire within the elastic limit prevents compressional loading from being applied to either end of the wire, which might result in permanent transverse distortion.

To prevent the application of a thrust load in excess of the elastic limit from being applied to the suspension wire at any time, I may further form the suspension head and the shaft means with axially-confronting abutment surfaces which are initially spaced apart a distance less than that corresponding to the elastic limit of strain of the wire, and are arranged to limit the relative axial movement of the gimbal to a safe value.

The improved suspension relieves the radial bearings of axial preloading arising from axial thrust or from relative thermal expansion, and thus minimizes and maintains uniform the frictional restraint against rotation of the gimbal. The axial suspension of the gimbal by the sole means of the thrust support leaf, at substantially only one point along the axis, permits relative thermal expansion to occur between the gimbal and the case without giving rise to a change in the rotational friction of the axial suspension means themselves. These advantages result in greater accuracy of response of the gyroscope in the torque-integrating function.

While the specification concludes with claims particularly pointing out the subject matter of the invention, it is believed that a clearer understanding may be had from the following detailed description of preferred embodiments, referring to the accompanying drawings, in which:

FIG. 2 is a sectional view of a fragmentary portion of the gyroscope of FIG. 1;

FIG. 3 is a sectional view taken along line 3—3 of FIG. 2, looking in the direction of the arrows; and FIG. 4 is a sectional view of a suspension element, according to an alternative embodiment of the invention.

Figure 1:
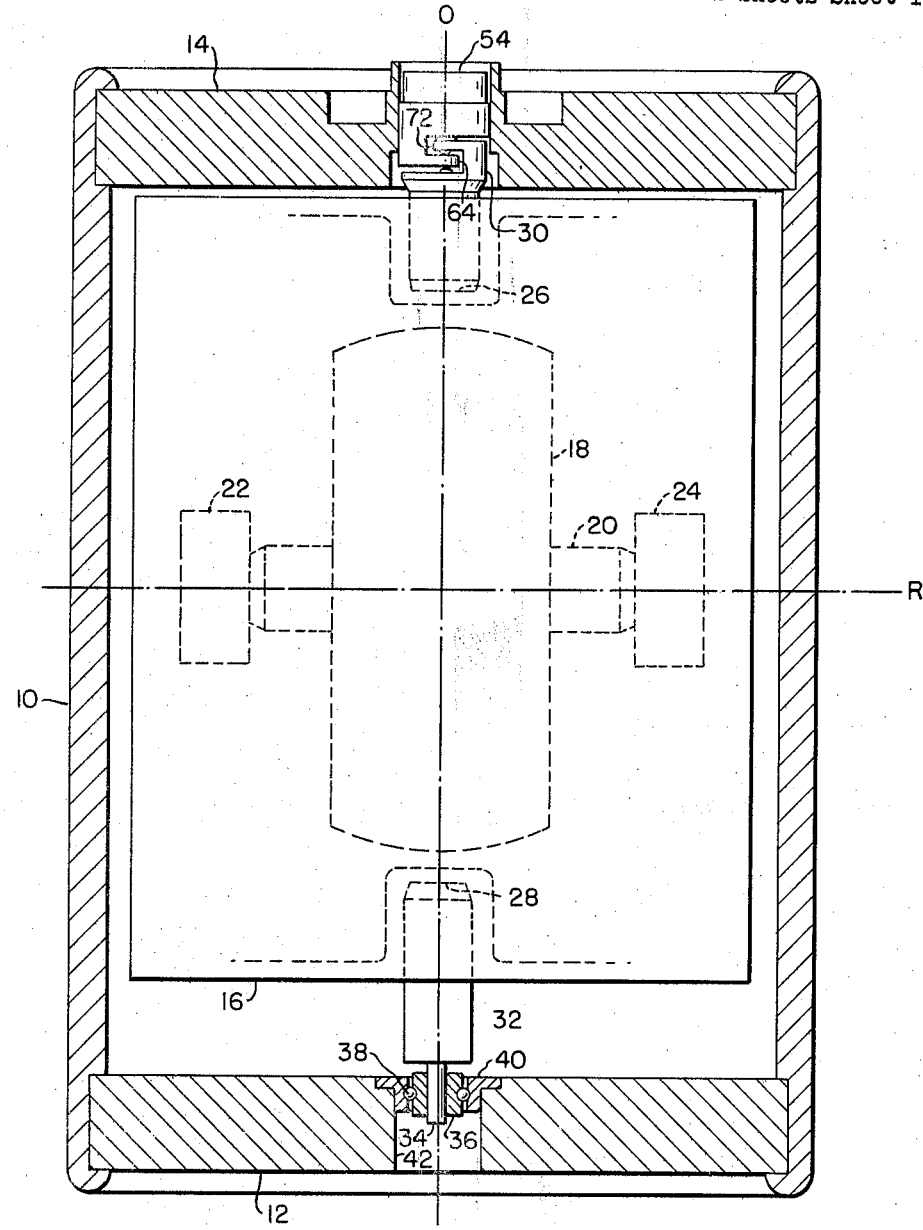
FIG. 1 is a schematic sectional view of an integrating gyroscope according to a first embodiment of the invention, taken along a plane defined by the rotational and output axes thereof.

Referring to FIGS. 1–3, a first embodiment of the improved suspension is shown in a gyroscope comprising a case 10 which includes end caps 12 and 14, a gimbal 16, and a rotor 18. The rotor 18 is rotatably supported within the gimbal upon a shaft 20 in bearings 22 and 24, for rotation by internal motive means (not shown) about an axis R. The gimbal is mounted, by the improved suspension means of the invention, for limited angular displacement about an output axis O which is mutually perpendicular to the axis R and to an input axis normal to the plane of the paper. The means thus far described are conventional, and no further detailed description thereof is believed necessary.

The gimbal 16 is formed with recesses 26 and 28, in which shaft means including a stub shaft 30 and a further stub shaft 32 are secured, respectively, to support the gimbal on the output axis O. The shaft 32 is formed with a cylindrical reduced extension 34, which is rotatably supported in the cap 12 by means of a radial bearing unit comprising an inner race 36, a plurality of circumferentially-spaced balls 38, and an outer race 40 fitted in an opening 42 formed centrally in the cap. The stub extension 34 is of a slightly smaller diameter than the mating bore of the inner race 36, so that the gimbal is free to slide axially. The radial clearances may be of the order of thirty millionths of an inch, as compared with .0002 inch radial play in the bearing unit, in a typical miniature precision gyroscope.

The stub shaft 30 is formed with a cylindrical reduced extension 44, which is supported in a radial bearing unit comprising an inner race 46, circumferentially-spaced balls 48, and an outer race 50. Again, there is sufficient clearance between the inner race and the shaft extension to permit free axial sliding movement of the gimbal with respect to the case. The outer race of the bearing is press-fitted in a stepped axial bore 52 in a suspension head 54, which is in turn press-fitted in a bore 56 of the end cap 14. An internally threaded insert 58 is placed over the outer race within the stepped bore 52, and tack-welded, as at 60, to the suspension head. A dust shield 62 is shown interposed between the insert and the bearing, but this is not necessary to the practice of the invention. The threaded insert 58 is employed to axially position the bearing within the suspension head, prior to the formation of the tack-weld 60.

According to a feature of the invention, the suspension head is formed with a thrust support leaf 64, which extends across the output axis O into an axially-extending recess 66 formed in the stub shaft 30. As shown, the base of the recess 66 is formed as a plane surface parallel to the output axis, and the suspension head is recessed by milling a plane surface 68, so that substantial clearance is provided for angular displacement of the stub shaft with respect to the suspension head.

The recess 66 terminates in axially-confronting portions 70 and 72 of the stub shaft, formed with radial plane surfaces. The portion 70 receives a thrust pin 74 within a bore 76, along the output axis. Similarly, the portion 72 receives a thrust pin 78 in an axial bore 80. The pins are brazed in position at 82 and 84, respectively, for engagement with opposite axial faces of a bearing insert 86 press-fitted or otherwise mounted in the leaf 64.

I prefer to form the thrust pins and the bearing insert of a material having a high modulus of elasticity, such as tungsten carbide, alumina, or diamond, and to form the thrust pins with spherical surfaces as shown, so as to maintain substantially point contact between these members under thrust loadings and thus minimize frictional resistance to rotation of the gimbal. The cooperating surfaces are preferably finished to a smooth condition, in the range of only a few millionths of an inch R.M.S. surface roughness. Friction may be further reduced by surface coating with materials such as indium or molybdenum disulphide. However, these surface coatings are of relatively low moduli of elasticity, and should have thicknesses no greater than about ten to twenty millionths of an inch, to prevent any substantial increase in the contact area.

The thrust pins cooperate with the support leaf to provide the sole axial restraint of the gimbal, and thus relieve the radial bearings of any preloading or variation in loading which could result in non-uniformly of frictional restraint against angular displacement of the gimbal. The support of gimbal thrust at substantially only one point along the axis also eliminates variations in the frictional restraint imposed by the axial suspension means themselves, which could otherwise result from relative thermal expansion of the gimbal and case.

Referring to FIG. 4, there is shown a modified embodiment in which the axial thrust is transmitted between a stub shaft 90 and a suspension head 92 by means of a tension wire 94 extending along the output axis O'. The stub shaft is formed with a reduced extension 96 radially supported in a bearing comprising an inner race 98, a circumferential row of balls 100, and an outer race 102 which is press-fitted in an insert 104 which forms a portion of the suspension head 92, being circumferentially welded thereto at 106. The shaft extension 96 is fitted with a small radial clearance in the inner race 98 for free axial sliding movement therein.

A thrust support leaf 108, similar in form to the leaf 64 of the previous embodiment, is formed in the suspension head and extends across the output axis into a recess 110 of the stub shaft. The tension wire 94 is secured along its mid-portion to the leaf 108, as by a weld 112, and extends between axially-confronting portions of the stub shaft, comprising an insert 114 welded at 116 in a lower end of a drilled extension 117 of the recess 110, and a wall 118 formed at the upper end of the extension 96 by a drilled extension 119 of the recess.

The wire is preferably placed under a tension approximately equal to half its elastic limit, and is secured to the axially-opposed portions 114 and 118 by means of welds 120 and 122, respectively. In this manner, the stub shaft 90 is supported against movement in either axial direction by means of the leaf 108. An axial load causes the tension in one end of the wire to increase, while the tension in the opposite end decreases proportionately. The pre-stressing of the wire insures that compressional loads, which might produce permanent distortion, are not applied to the wire at any time; and further causes the axial spring constant of the wire to be doubled, as will be readily understood by those skilled in the art, for increased stiffness against axial deflection.

To limit relative movement of the parts to values less than the elastic limit of strain of the wire, the stub shaft and suspension head are formed with axially confronting radial abutment surfaces 124 and 126, respectively, which are initially spaced apart a distance $e$ slightly less than half the elastic limit of strain of the wire.

These surfaces are arranged to abut to limit relative movement of the stub shaft upwardly, as viewed in FIG. 4, to a value which will not permanently stretch the wire. A ring 128 is secured upon the upper end of the shaft extension 96 by the weld 122, being initially spaced from a radial surface 130 of the head a distance $d$, equal to the distance $e$, to limit downward movement of the shaft in a similar manner.

The cross-sectional area, form, and length of the wire should be selected with due consideration given to the permissible error, in a given class of gyroscope, which will result from the torsional restraint. The torsional spring constant of a wire is inversely proportional to its length, and is dependent on the shape of its section; a thin, flat ribbon having a lower spring constant than a circular wire of equal cross-sectional area. The area of the wire or ribbon is preferably of a minimum value sufficient to support the anticipated forces of axial acceleration, and the length is as great as may be practicable in a gyroscope of a given size.

The embodiment of FIG. 4 affords substantially the same advantages as that of FIGS. 1-3, but completely eliminates rotational friction from the suspension means at the cost of introducing a minor error arising from the torsional spring action of the wire.

The improved gimbal suspension relieves the radial bearings of axial load, thus minimizing rotational friction in the radial bearings as well as the axial suspension means; the arrangement also maintains a substantially uniform rotational friction in spite of relative thermal expansion of the gimbal and case, thus affording improved freedom from random errors in the performance of the torque-integrating function. The foregoing detailed description of preferred embodiments of the invention have been given for purposes of illustration, and various modifications will readily occur to those skilled in the art without departing from the true scope of the invention. It is therefore intended to define the invention in the appended claims without limitation to the specific arrangements herein described.

What I claim is:

1. A suspension for a gyroscope gimbal, comprising a pair of axially spaced shaft elements adapted to mount a gimbal on an output axis, radial bearing means mounted on each of said shaft elements, said radial bearing means supporting said shaft elements in axially-movable relation for rotation about said output axis to form substantially the sole radial support of said shaft elements one of said shaft elements being formed with an axially-extending recess, supporting means for said radial bearing means, said supporting means including a leaf extending into said recess across said output axis, and suspension means mounted in said one of said shaft elements and extending in said recess to engage said leaf along said output axis in freely rotatable relationship to form the sole axial support of said shaft elements, said suspension means comprising a transversely and torsionally flexible wire extending along said output axis and secured along a mid-portion thereof to said leaf, the ends of said wire being secured to said one of said one shaft elements to support axial thrust of said shaft elements in tension.

2. A suspension for a gyroscope gimbal, comprising a pair of axially spaced shaft elements adapted to mount a gimbal on an output axis, radial bearing means mounted on each of said shaft elements, said bearing means receiving said shaft elements in axially-movable relationship for angular displacement about said output axis, one of said shaft elements being formed with a recess extending transversely across said axis and terminating in portions mutually confronting along said axis, supporting means for said bearings means, a leaf carried by said supporting means and extending into said recess across said axis, and suspension means comprising a wire secured to said leaf along a central portion thereof on said output axis, and secured at opposite ends thereof in said confronting portions, to locate said shaft elements axially.

3. A suspension as recited in claim 2, in which said wire is subjected to an initial tension approximately equal to half its elastic limit.

4. A suspension as recited in claim 2, in which said one of said shaft elements and said supporting means are each formed with a pair of radial abutment surfaces facing oppositely along said axis, each one of said abutment surfaces of each pair being arranged to axially confront one of the other pair and being initially spaced therefrom a distance corresponding to approximately half the elastic limit of strain of said wire.

5. A gyroscope comprising, in combination: a case; a gimbal located within said case; a rotor mounted in said gimbal for rotation about a first axis; and a suspension for supporting said gimbal in said case for limited angular displacement about an output axis normal to said first axis; said suspension comprising shaft means secured to said gimbal and including shaft elements extending oppositely therefrom along said output axis, a pair of radial bearing means mounted in opposed walls of said case and each supporting one of said shaft elements in axially-movable relationship for angular displacement about said output axis, one of said shaft elements being formed with a recess extending transversely across said axis and terminating axially in portions mutually confronting along said output axis, a leaf mounted in said case and extending into said recess across said axis, and suspension means mounted in said confronting portions and engaging said leaf on said axis in angularly-displaceable relation to axially locate said gimbal along said output axis, said suspension means comprising a transversely and torsionally flexible wire extending along said output axis in said recess and secured at a mid-portion thereof to said leaf and at opposite ends thereof to said confronting portions.

6. A gyroscope comprising, in combination: a case; a gimbal located within said case; a rotor mounted in said gimbal for rotation about a first axis; and a suspension for supporting said gimbal in said case for limited angular displacement about an output axis normal to said first axis; said suspension comprising shaft means secured to said gimbal and including shaft elements extending oppositely therefrom along said output axis, a pair of radial bearing means mounted in opposed walls of said case and each supporting one of said shaft elements in axially-movable relationship for angular displacement about said output axis, one of said shaft elements being formed with a recess extending transversely across said axis and terminating axially in portions mutually confronting along said output axis, a leaf mounted in said case and extending into said recess across said axis, said leaf being formed with plane surfaces radial to said output axis and facing in opposite axial directions, and suspension means mounted in said confronting portions and engaging said leaf on said axis in angularly-displaceable relation to axially locate said gimbal along said output axis, said suspension means comprising a pair of thrust pins each mounted in one of said confronting portions and extending into surface contact with said leaf on said output axis.

References Cited by the Examiner

UNITED STATES PATENTS 2,253,119 8/1941 Goerth _____ 74—5 X
2,828,627 4/1958 Gabrielson _____ 74—5

FOREIGN PATENTS 896,268 11/1953 Germany.

BROUGHTON G. DURHAM, *Primary Examiner.*

DON A. WAITE, *Examiner.*